United States Patent
Tiyyagura et al.

(10) Patent No.: US 10,810,709 B1
(45) Date of Patent: Oct. 20, 2020

(54) SYSTEMS AND METHODS FOR IMPROVING THE QUALITY OF TEXT DOCUMENTS USING ARTIFICIAL INTELLIGENCE

(71) Applicant: EYGS LLP, London (GB)

(72) Inventors: Sunil Reddy Tiyyagura, Bengaluru (IN); Sridhar Venkataraman Dasaratha, Bangalore (IN)

(73) Assignee: EYGS LLP, London (GB)

( * ) Notice: Subject to any disclaimer, the term of this patent is extended or adjusted under 35 U.S.C. 154(b) by 0 days.

(21) Appl. No.: 16/690,886

(22) Filed: Nov. 21, 2019

(51) Int. Cl.
| | |
|---|---|
| *G06T 5/00* | (2006.01) |
| *G06K 9/00* | (2006.01) |
| *H04N 1/409* | (2006.01) |
| *G06K 9/40* | (2006.01) |
| *H04N 1/00* | (2006.01) |
| *H04N 1/40* | (2006.01) |
| *G06K 9/44* | (2006.01) |
| *G06K 9/80* | (2006.01) |
| *G06N 3/02* | (2006.01) |

(52) U.S. Cl.
CPC ............ *G06T 5/002* (2013.01); *G06K 9/0051* (2013.01); *G06K 9/00463* (2013.01); *G06K 9/40* (2013.01); *G06K 9/44* (2013.01); *G06K 9/80* (2013.01); *G06N 3/02* (2013.01); *H04N 1/00331* (2013.01); *H04N 1/409* (2013.01); *H04N 1/40062* (2013.01); *G06K 2209/01* (2013.01); *G06T 2207/10008* (2013.01); *G06T 2207/20084* (2013.01); *G06T 2207/30176* (2013.01); *H04N 2201/0081* (2013.01)

(58) Field of Classification Search
None
See application file for complete search history.

(56) References Cited

U.S. PATENT DOCUMENTS

| | | | |
|---|---|---|---|
| 5,048,107 | A | 9/1991 | Tachikawa |
| 5,848,186 | A | 12/1998 | Wang et al. |
| 6,006,240 | A | 12/1999 | Handley |
| 6,735,748 | B1 | 5/2004 | Teig et al. |
| 6,757,870 | B1 | 6/2004 | Stinger |

(Continued)

OTHER PUBLICATIONS

Office Action for U.S. Appl. No. 16/382,707, dated Sep. 4, 2019, 11 pages.

(Continued)

*Primary Examiner* — Scott A Rogers
(74) *Attorney, Agent, or Firm* — Cooley LLP

(57) ABSTRACT

In some embodiments, an apparatus includes a memory and a processor operatively coupled to the memory. The processor is configured to receive an electronic document having a set of pages, and partition a page from the set of pages of the electronic document into a set of portions. The processor is configured to convert each portion of the set of portions into a negative image of a set of negative images. The processor is configured to produce, based on an artificial intelligence algorithm, a de-noised negative image of each negative image and convert each de-noised negative image of a set of de-noised negative images into a positive image of a set of positive images, and combine each positive image of the set of positive images to produce a de-noised page. The de-noised page has artifacts less than artifacts of the page of the electronic document.

20 Claims, 4 Drawing Sheets

(56) References Cited

U.S. PATENT DOCUMENTS

| | | | |
|---|---|---|---|
| 7,283,683 B1* | 10/2007 | Nakamura | G06T 5/40 382/274 |
| 7,548,847 B2 | 6/2009 | Acero et al. | |
| 8,165,974 B2 | 4/2012 | Privault et al. | |
| 8,731,300 B2 | 5/2014 | Rodriquez et al. | |
| 9,172,842 B2* | 10/2015 | Booth | H04N 1/40012 |
| 9,235,812 B2 | 1/2016 | Scholtes | |
| 9,269,053 B2 | 2/2016 | Naslund et al. | |
| 9,342,892 B2* | 5/2016 | Booth | G06T 5/40 |
| 9,348,815 B1 | 5/2016 | Estes et al. | |
| 9,875,736 B2 | 1/2018 | Kim et al. | |
| 10,002,129 B1 | 6/2018 | D'Souza | |
| 10,062,039 B1 | 8/2018 | Lockett | |
| 2003/0097384 A1 | 5/2003 | Hu et al. | |
| 2006/0288268 A1 | 12/2006 | Srinivasan et al. | |
| 2010/0174975 A1 | 7/2010 | Mansfield et al. | |
| 2011/0249905 A1 | 10/2011 | Singh et al. | |
| 2014/0223284 A1 | 8/2014 | Rankin, Jr. et al. | |
| 2015/0356461 A1 | 12/2015 | Vinyals et al. | |
| 2016/0078364 A1 | 3/2016 | Chiu et al. | |
| 2016/0162456 A1 | 6/2016 | Munro et al. | |
| 2016/0350280 A1 | 12/2016 | Lavallee et al. | |
| 2017/0083829 A1 | 3/2017 | Kang et al. | |
| 2017/0235848 A1 | 8/2017 | Van Dusen et al. | |
| 2018/0060303 A1 | 3/2018 | Sarikaya et al. | |
| 2018/0157723 A1 | 6/2018 | Chougule et al. | |
| 2018/0181797 A1 | 6/2018 | Han et al. | |
| 2018/0204360 A1 | 7/2018 | Bekas et al. | |
| 2019/0050381 A1 | 2/2019 | Agrawal et al. | |

OTHER PUBLICATIONS

Babatunde, F. F. et al., "Automatic Table Recognition and Extraction from Heterogeneous Documents," Journal of Computer and Communications, vol. 3, pp. 100-110 (Dec. 2015).

Dong, C. et al., "Image Super-Resolution Using Deep Convolutional Networks," arXiv:1501.00092v3 [cs.CV], Dec. 31, 2014, Retrieved from the Internet: <URL: https://arxiv.org/pdf/1501.00092.pdf>, 14 pages.

Dong, R. et al., "Multi-input attention for unsupervised OCR correction," Proceedings of the 56th Annual Meetings of the Association for Computational Linguistics (Long Papers), Melbourne, Australia, Jul. 15-20, 2018, pp. 2363-2372.

Kharb, L. et al., "Embedding Intelligence through Cognitive Services," International Journal for Research in Applied Science & Engineering Technology (IJRASET), ISSN: 2321-9653; IC Value: 45.98; SJ Impact Factor:6.887, vol. 5, Issue XI, Nov. 2017, pp. 533-537.

Paladines, J. et al., "An Intelligent Tutoring System for Procedural Training with Natural Language Interaction," Conference Paper, DOI: 10.5220/0007712203070314, Jan. 2019, 9 pages.

Howard, J. et al., "Universal Language Model Fine-tuning for Text Classification," arXiv:1801.06146v5 [cs.CL], May 23, 2018, Retrieved from the Internet: <URL: https://arxiv.org/pdf/1801.06146.pdf>, 12 pages.

Mac, A. J. et al., "Locating tables in scanned documents for reconstructing and republishing," arXiv:1412.7689 [cs.CV], Dec. 2014, The 7th International Conference on Information and Automation for Sustainability (ICIAfS) 2014, 6 pages.

Kasar, T. et al., "Learning to Detect Tables in Scanned Document Images Using Line Information," ICDAR '13: Proceedings of the 2013 12th International Conference on Document Analysis and Recognition, Aug. 2013, Washington, DC, pp. 1185-1189.

Isola, P. et al., "Image-to-Image Translation with Conditional Adversarial Networks," arXiv:1611.07004v3 [cs.CV] Nov. 26, 2018, Retrieved from the Internet: <URL: https://arxiv.org/pdf/1611.07004.pdf>, 17 pages.

Klampfl, S. et al., "A Comparison of Two Unsupervised Table Recognition Methods from Digital Scientific Articles," D-Lib Magazine, vol. 20, No. 11/12, Nov./Dec. 2014, DOI:10.1045/november14-klampfl, 15 pages.

Fan, M. et al., "Detecting Table Region in PDF Documents Using Distant Supervision," arXiv:1506.08891v6 [cs.CV], Sep. 22, 2015, Retrieved from the Internet: <URL: https://arxiv.org/pdf/1506.08891v6.pdf>, 7 pages.

Pinto, D. et al., "Table extraction using conditional random fields," Proceedings of the 26th Annual International ACM SIGIR Conference on Research and Development in Information Retrieval (SIGIR '03), ACM, New York, NY, USA, pp. 235-242, Jul. 2003. DOI= http://dx.doi.org/10.1145/860435.860479, 8 pages.

Hanifah, L. et al., "Table Extraction from Web Pages Using Conditional Random Fields to Extract Toponym Related Data," Journal of Physics: Conference Series, vol. 801, Issue 1, Article ID 012064, Jan. 2017, 8 pages.

Staar, P. W. J. et al., "Corpus conversion service: A machine learning platform to ingest documents at scale," Applied Data Science Track Paper, KDD 2018, Aug. 19-23, 2018, London, United Kingdom, pp. 774-782.

Handley, J. C., "Table analysis for multi-line cell identification," Proceedings of SPIE, vol. 4307, Jan. 2001, pp. 34-43.

Vincent, P. et al., "Extracting and composing robust features with denoising autoencoders," in Proceedings of the 25th International Conference on Machine Learning, Helsinki, Finland, 2008, 8 pages.

Mao, X-J. et al., "Image Restoration Using Very Deep Convolutional Encoder-Decoder Networks with Symmetric Skip Connections," 30th Conference on Neural Information Processing Systems (NIPS 2016), Barcelona, Spain, Retrieved from the Internet: <URL: https://papers.nips.cc/paper/6172-image-restoration-using-very-deep-convolutional-encoder-decoder-networks-with-symmetric-skip-connections.pdf>, 9 pages.

Mao, X-J. et al., "Image Restoration Using Convolutional Auto-encoders with Symmetric Skip Connections," arXiv:1606.08921v3 [cs.CV], Aug. 30, 2016, Retrieved from the Internet: <URL: https://arxiv.org/abs/1606.08921>, 17 pages.

Lehtinen, J. et al., "Noise2Noise: Learning Image Restoration without Clean Data," Proceedings of the 35th International Conference on Machine Learning, Stockholm, Sweden, PMLR 80, Jul. 10-15, 2018, Retrieved from the Internet: <URL: http://proceedings.mlr.press/v80/lehtinen18a/lehtinen18a.pdf>, 10 pages.

Schreiber, S. et al., "DeepDeSRT: Deep Learning for Detection and Structure Recognition of Tables in Document Images," 2017 14th IAPR International Conference on Document Analysis and Recognition (ICDAR) Nov. 9-15, 2017, Retrieved from the Internet: <https://www.dfki.de/fileadmin/user_upload/import/9672_PID4966073.pdf>, 6 pages.

Kavasidis, I. et al., "A Saliency-based Convolutional Neural Network for Table and Chart Detection in Digitized Documents," arXiv.1804.06236v1 [cs.CV], Apr. 17, 2018, Retrieved from the Internet: <URL: https://arxiv.org/pdf/1804.06236.pdf>, 13 pages.

Xiang, R. Research Statement, Aug. 2018, 6 pages.

Harit, G. et al., "Table Detection in Document Images using Header and Trailer Patterns," ICVGIP '12, Dec. 16-19, 2012, Mumbai, India, 8 pages.

* cited by examiner

SYSTEMS AND METHODS FOR IMPROVING THE QUALITY OF TEXT DOCUMENTS USING ARTIFICIAL INTELLIGENCE

FIELD OF THE DISCLOSURE

This disclosure relates to systems and methods for improving the quality of text documents using artificial intelligence.

BACKGROUND

Scanned documents and other image-based documents (e.g., pictures taken of text documents) are often degraded with artifacts such as blurring and fading. Using the Optical Character Recognition (OCR) to convert such image-based documents into documents with computer-readable characters is challenging. Thus, a need exists to pre-process these documents to improve the quality of the documents prior to using OCR and automate the pre-processes such that a large number of image-based documents can be converted into documents with computer-readable characters in a short time.

SUMMARY

Figure 1:
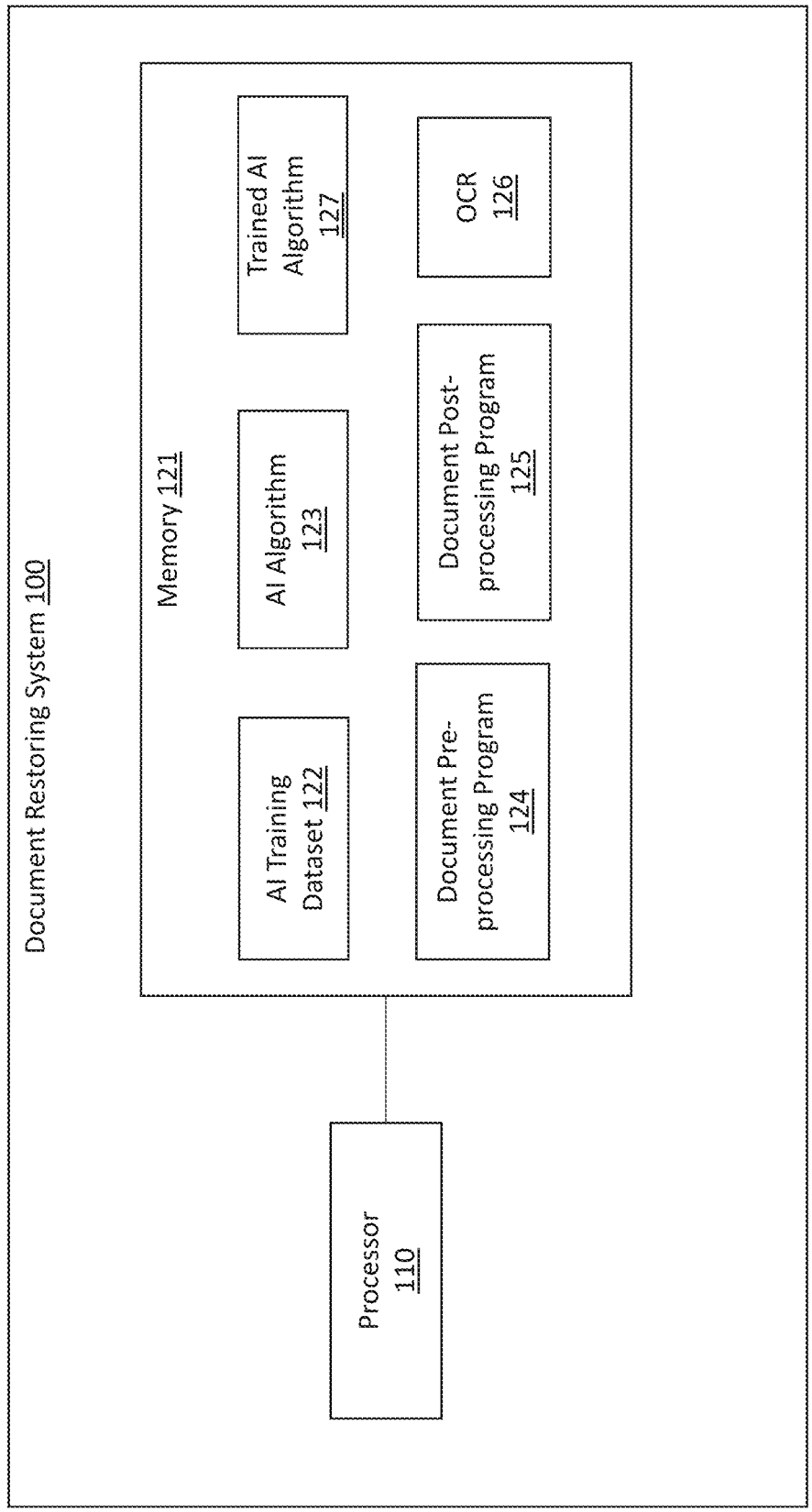
FIG. 1 shows a block diagram illustrating a document restoring system, according to some embodiments.

In some embodiments, an apparatus includes a memory and a processor operatively coupled to the memory. The processor is configured to receive an electronic document having a set of pages, and partition a page from the set of pages of the electronic document into a set of portions. The page includes alphanumeric characters. The processor is configured to convert each portion of the set of portions into a negative image of a set of negative images. The processor is configured to produce, based on an artificial intelligence algorithm, a de-noised negative image of each negative image of the set of negative images. The processor is configured to convert each de-noised negative image of a set of de-noised negative images into a positive image of a set of positive images, and combine each positive image of the set of positive images to produce a de-noised page. The de-noised page has artifacts less than artifacts of the page of the electronic document.

DETAILED DESCRIPTION

Some embodiments describe systems and methods to train and use an artificial intelligence algorithm (e.g., an auto-encoder) based on Deep Neural Networks (DNNs) to restore electronic documents and improve the quality of the electronic documents by removing artifacts. Artifacts include any deviation (or noise) from the original electronic document (or the perfect document version). For example, the artifacts include blurring, fading, salt & pepper, watermarks, and/or the like. These electronic documents include alphanumeric characters and can be, for example, scanned documents or images taken by a camera. To subsequently and automatically read and process these electronic documents, they need to be cleaned by removing artifacts such as blurring, fading, salt & pepper, watermarks, and/or the like, before being processed by programs such as Optical Character Recognition (OCR).

In some embodiments, an apparatus includes a memory and a processor operatively coupled to the memory. The processor is configured to receive an electronic document having a set of pages, and partition a page from the set of pages of the electronic document into a set of portions. The page includes alphanumeric characters. The processor is configured to convert each portion of the set of portions into a negative image of a set of negative images. The processor is configured to produce, based on an artificial intelligence algorithm, a de-noised negative image of each negative image of the set of negative images. The processor is configured to convert each de-noised negative image of a set of de-noised negative images into a positive image of a set of positive images, and combine each positive image of the set of positive images to produce a de-noised page. The de-noised page has artifacts less than artifacts of the page of the electronic document.

As used herein, the singular forms "a," "an" and "the" include plural referents unless the context clearly dictates otherwise. Thus, for example, the term "an electronic document" is intended to mean a single electronic document or multiple electronic documents.

FIG. 1 shows a block diagram illustrating a document restoring system, according to some embodiments. In some embodiments, the document restoring system 100 is configured to restore electronic documents by removing artifacts such as blurring, fading, salt & pepper, watermarks, and/or the like, using a trained AI algorithm. The document restoring system 100 can include a processor 110 and a memory 121 operatively coupled to the processor 110. The document restoring system 100 can be a compute device (or multiple compute devices) having processing capabilities. In some instances, the document restoring system 100 can be any combination of hardware-based module (e.g., a field-programmable gate array (FPGA), an application specific integrated circuit (ASIC), a digital signal processor (DSP)) and/or software-based module (computer code stored in memory 121 and/or executed at the processor 110). In some instances, the document restoring system 100 can be a server such as, for example, a web server, an application server, a proxy server, a telnet server, a file transfer protocol (FTP) server, a mail server, a list server, a collaboration server and/or the like. In other instances, the document restoring system 100 can be a personal computing device such as a desktop computer, a laptop computer, a personal digital assistant (PDA), a standard mobile telephone, a tablet personal computer (PC), and/or so forth. In some instances, the document restoring system 100 can communicate with other servers or client devices (not shown) via a network (not shown) (e.g., the Internet, an intranet, a local area network (LAN), a virtual private network (VPN), a wireless LAN (WLAN), a wired network, a wireless network and/or the like).

The memory 121 can be, for example, a random-access memory (RAM) (e.g., a dynamic RAM, a static RAM), a flash memory, a removable memory, a hard drive, a database and/or so forth. In some implementations, the memory 121 can include (or store), for example, a database, process, application, virtual machine, and/or other software modules (stored and/or executing in hardware) and/or hardware modules configured to execute a document restoring process as described with regards to FIG. 4. In such implementations, instructions for executing the document restoring process and/or the associated methods can be stored within the memory 121 and executed at the processor 110. In some implementations, the memory 121 can store the AI training dataset 122, the AI algorithm 123, the trained AI algorithm 127, the document pre-processing program 124, the document post-processing program 125, and the Optical Character Recognition (OCR) 126.

The processor 110 can be configured to, for example, write data into and read data from the memory 121, and execute the instructions stored within the memory 121. The processor 110 can also be configured to execute and/or control, for example, the operations of other components of the document restoring system 100 (such as a network interface card, other peripheral processing components (not shown)). In some implementations, based on the instructions stored within the memory 121, the processor 110 can be configured to execute the document restoring process described with respect to FIG. 4.

In use, the document restoring system 100 can train the AI algorithm 123 (e.g., an auto-encoder based on convolution neural networks) using the AI training dataset 122 to generate a trained AI algorithm 127. The AI training dataset 122 includes a set of clean documents and a set of corresponding noisy documents having artifacts such as blurring, fading, salt & pepper, watermarks, and/or the like. In some implementations, the document restoring system 100 (e.g., by executing the document pre-processing program 124) can divide each page of a set of pages of a clean document into a set of patches (or a set of portions). In some instances, each patch of the set of patches can have a size of 250 pixels×250 pixels. In other words, each patch has a size substantially in a first direction of a multiple of 250 pixels and a size substantially in a second direction perpendicular to the first direction of a multiple of 250 pixels. In some instances, each page of the clean document can be scaled to the nearest multiple of 250 pixels in each direction before dividing the page into a set of patches.

In some implementations, the document restoring system 100 can (e.g., by executing the document pre-processing program 124) add artifacts such as blurring, fading, salt & pepper, watermarks, and/or the like to each patch of the set of patches in the clean document to generate a set of corresponding noisy patches of the noisy document. In other words, the document restoring system 100 can generate the set of corresponding noisy documents based on the set of clean documents.

The clean document and the noisy document include alphanumeric characters (e.g., texts and numbers). In some situations, a scanned document or an image taken by a camera has the alphanumeric characters in greyscale and the background in the color of white. For example, each pixel of a 8-bit greyscale image has a pixel value between 0 to 255. The pixel values of alphanumeric characters (in greyscale) are lower than the pixel values of the background (in white). Such a document or an image is positive.

The document restoring system 100 can (e.g., by executing the document pre-processing program 124) convert a positive document into a negative document by changing pixel values of each pixel symmetrically relative to the middle point of 0-255 (i.e., 127.5). For example, a pixel of an alphanumeric character can have a pixel value of 0 (i.e., black) in a positive image. The document restoring system 100 can convert the pixel by changing its pixel value from 0 to 255, thus creating a negative image. The pixel value of the white background is 255 in a positive image, and the document restoring system 100 can convert the pixel of the background in the positive image by changing its pixel value from 255 to 0, thus creating a negative image. In a grayscale image, a pixel (either an alphanumeric character or an artifact) can have a pixel value of, for example, 100 in a positive image. The document restoring system 100 can generate a negative image of the pixel by changing the pixel value from 100 to 155. In the negative image, the pixel value of the alphanumeric characters are higher than the pixel value of the background.

Figures 2A, 2B:
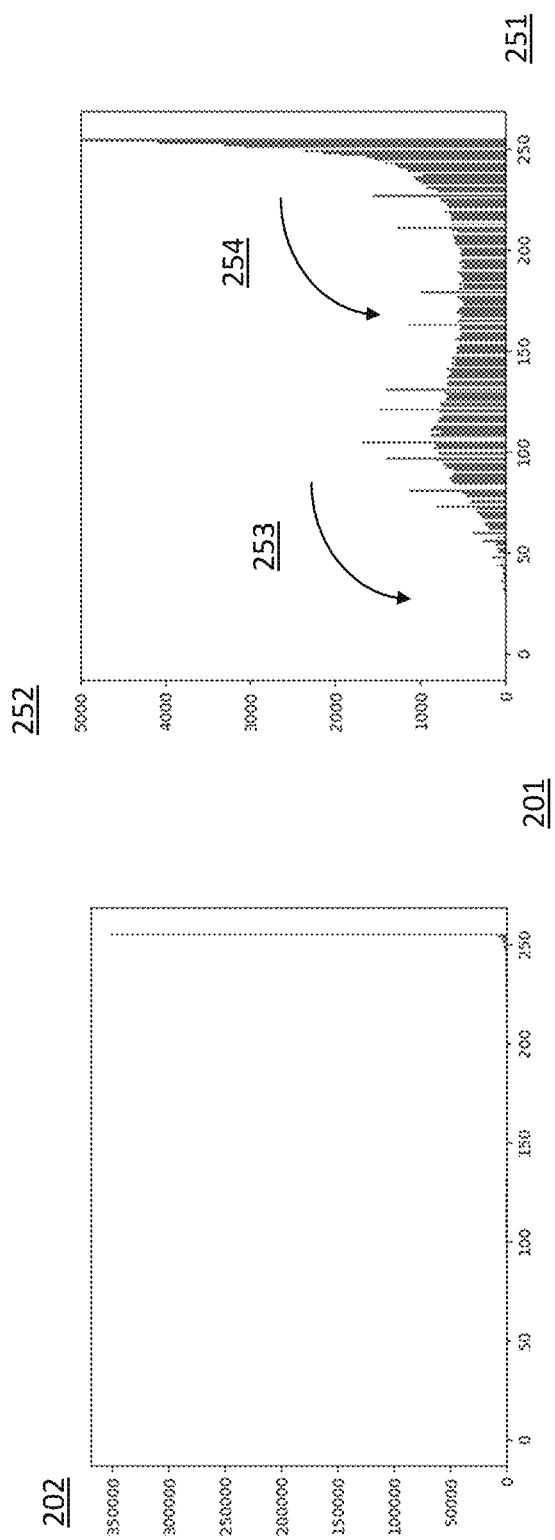
FIGS. 2A-2B show histograms of pixel value distribution of a positive image of an example electronic document, according to some embodiments.

FIGS. 2A-2B show histograms of pixel value distribution of a positive image of an example electronic document, according to some embodiments. The horizontal axis 201 and 251 are pixel values 0-255 and the vertical axis 202 and 252 are the number of pixels. FIG. 2A shows that in the positive image of this example electronic document, the majority of pixels (about 350000 pixels) have a pixel value of 255 (i.e., white background). FIG. 2B is a zoomed-up histogram of FIG. 2A, showing number of pixels (252) totaling between 0-5000 for the range of pixel values 0-255. The region 253 shows that very few pixels have pixel values between 0-100 (i.e., alphanumeric characters in substantially black). The region 254 shows that a number of pixels have pixel values between 100 and 250 (i.e., artifacts in gray).

Returning to FIG. 1, in some implementations, the document restoring system 100 can (e.g., by executing the document pre-processing program 124) convert each patch of the set of patches in the clean document into a negative patch of a set of negative patches of the clean document by changing pixel values of each pixel in the 0-255 scale relative to the middle point of 0-255 scale. Similarly, the document restoring system 100 can perform similar processing steps to the noisy patches. The document restoring system 100 can convert each patch of the set of patches in the noisy document into a negative patch of a set of negative patches of the noisy document by changing pixel values of each pixel in the 0-255 scale relative to the middle point of 0-255 scale.

The document restoring system 100 can train, using, for example, supervised learning, the AI algorithm by providing the set of negative patches of the noisy document into the AI algorithm as input and the set of negative patches of the clean document into the AI algorithm as intended-output (or true labels). The weights are learned by minimizing the difference between the output and the clean image. In some instances, the document restoring system 100 can train, using unsupervised learning, the AI algorithm by providing the set of negative patches of the noisy document into the AI algorithm as the input and the output. The document restoring system 100 can generate the trained AI algorithm. The trained AI algorithm can be, for example, a Deep Neural Network algorithm including an auto-encoder algorithm based on convolutional layers. An auto-encoder neural network can be a supervised or an unsupervised learning algorithm that applies backpropagation, setting the target values to be equal to the inputs. Details of an example of the auto-encoder algorithm are described in X. Mao, et. al., "Image Restoration Using Convolutional Auto-encoders with Symmetric Skip Connections," published on Aug. 30, 2016, retrieved from https://arxiv.org/abs/1606.08921, which is incorporated herein by reference in its entirety.

After the training phase ends, the document restoring system 100 can analyze a different electronic document (i.e., a document not used for training) using the trained AI algorithm 127. The document restoring system 100 can restore the electronic document (also referred to as a document, an original document) and generate a de-noised (or cleaner) version of the document. In some instances, the electronic document can be in Portable Document Format (PDF), a format of JPEG, BMP, PNG, TIFF, and/or other document file formats. The electronic document includes a set of pages (e.g., one or more pages).

Specifically, the document restoring system 100 can pre-process the document using the document pre-processing program 124. In some instances, the document restoring system 100 can divide each page of a set of pages of the document into a set of patches (or a set of portions). In some instances, each patch of the set of patches can have a size of 250 pixels×250 pixels. In other words, each patch has a size substantially in a first direction of a multiple of 250 pixels and a size substantially in a second direction perpendicular to the first direction of a multiple of 250 pixels. In some instances, each page of the document can be scaled to the nearest multiple of 250 pixels in each direction before dividing the page into a set of patches.

In some instances, each page of the document can be (or be converted to) an 8-bit greyscale image having alphanumeric characters (e.g., texts and numbers). Each page of the document (or each patch) can be a positive image. The document restoring system 100 can (e.g., by executing the document pre-processing program 124) convert the positive image of each patch into a negative image of that patch by changing pixel values of each pixel. Similar to the conversion discussed earlier with the AI training dataset, the document restoring system 100 can change the pixel values of each pixel symmetrically relative to the middle point of 0-255 (i.e., 127.5). In the positive image, the pixel values of the alphanumeric characters are generally lower than the pixel values of the background. In the negative image, the pixel values of the alphanumeric characters are generally higher than the pixel values of the background.

The document restoring system 100 can convert each pixel in each patch of the set of patches into a negative image of a set of negative images. The document restoring system 100 can produce, based on the trained AI algorithm 127, a de-noised negative image of each negative image of the set of negative images. The document restoring system 100 can then convert each de-noised negative image of a set of de-noised negative image into a positive image of a set of positive images. Specifically, the document restoring system 100 can convert a de-noised negative image to a positive image by changing the pixel values of each pixel in the de-noised negative image symmetrically between 0 and 255. For example, a pixel (either an alphanumeric character or an artifact) can have a pixel value of 155 in the de-noised negative image. The document restoring system 100 can generate a positive image of the pixel by changing the pixel value from 155 to 100.

In some instances, the document restoring system 100 can (by executing the document post-processing program 125) combine each positive image of the set of positive images to produce a de-noised page. The de-noised page has a fewer number of artifacts than the number of artifacts of the page of the document. Using negative images with the trained AI algorithm can produce better quality of the de-noised images because the alphanumeric characters in negative images often have higher pixel values than the background. The weighting parameters in the trained AI algorithm can be more sensitive to the alphanumeric characters than the background, thus producing better quality of the de-noised images.

In some instances, the document restoring system 100 can assign each patch of the set of patches of the document a position identifier of a set of position identifiers when the document restoring system 100 partitions the document (or the page) into the set of patches. The document restoring system 100 can combine the set of de-noised positive patches based on the position identifier of that patch and generate the de-noised page. For example, the document restoring system 100 can assign a row number of 3 and a column number of 8 (e.g., (3, 8)) to a patch. After converting the patch to a negative image, producing a de-noised negative image of the patch based on the trained AI algorithm, and converting the de-noised negative image to a de-noised positive image, the document restoring system 100 can stitch the de-noised positive image back into the position (row number of 3 and column number of 8) with other de-noised patches to generate the de-noised page.

In some implementations, a page of the document includes alphanumeric characters and non-alphanumeric content (e.g., a picture, graphic data, and/or the like). The document restoring system 100 can (by executing the document pre-processing program 124) identify and remove the non-alphanumeric content from the page prior to dividing the page into the set of patches. In some instances, the document restoring system 100 can use the trained object detection deep learning network (e.g., region-based Convolutional Neural Network (CNN)) to identify the non-alphanumeric content in each page. When the document restoring system 100 removes the non-alphanumeric content, the spatial information of the non-alphanumeric content is saved at the document restoring system 100. In some instances, the document restoring system 100 can replace the non-alphanumeric content with a placeholder background color (e.g., white) to generate an edited page. The document restoring system 100 can de-noise the edited page using the trained AI algorithm. In some instances, the document restoring system 100 can de-noise the extracted non-alphanumeric content using a second AI algorithm that has been trained with positive images. After the document restoring system 100 combines each de-noised positive image to produce the de-noised page, the document restoring system 100 can place the de-noised non-alphanumeric content (or the original non-alphanumeric content) back to the same position in the de-noised page based on the spatial information.

In some instances, the electronic document can include a page in color. The document restoring system 100 can convert the color page (having, for example, three filters: red, blue, and green) to a page in grey scale (e.g., having one filter with pixel values between 0 to 255). The document restoring system 100 can, (by executing the document pre-processing program 124), normalize the pixel value of 0-255 to between 0 to 1 or −1 to +1. In some instances, the distribution can be shifted around the mean or median of the batch (i.e., the set of patches) or the entire document. In some instances, the document restoring system 100 can normalize pixel values of both negative images and positive images to between 0 and 1.

In some instances, the document restoring system 100 can train the AI algorithm with an augmented training dataset that includes documents in different rotations (e.g., portrait or landscape.) The document restoring system 100 can clean, using the trained AI algorithm, new documents that can be in different rotations without correcting the rotations of the new documents before cleaning. In other instances, the document restoring system 100 can train the AI algorithm with training dataset that includes documents in a pre-determined orientation. For example, the document restoring system 100 can rotate the documents in the training dataset to a pre-determined orientation before training the AI algorithm. Prior to cleaning new documents, the document restoring system 100 can rotate the new documents to the predetermined orientation, and clean using the trained AI algorithm. An example rotation correction program includes OpenCV-based functionality.

In some implementations, the document restoring system 100 can, optionally, send the de-noised page to the OCR 126 for further reading and processing of the document. In some instances, the document restoring system 100 can receive the electronic document (to-be-cleaned) from the OCR 126. The cleaning of the document using the document restoring process (described above and with regards to FIG. 4) can improve the quality of scanned documents output by the OCR (by removing artifacts from the documents and increasing the readability of the alphanumeric characters by a compute device). It also allows for better automation of the reading and processing of text documents.

Figure 3A:
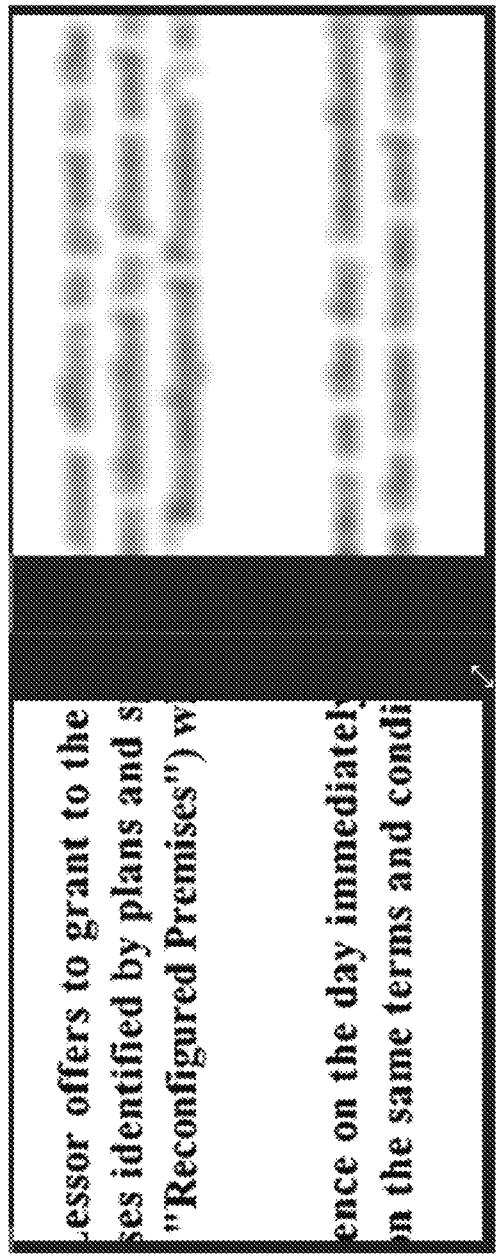
FIG. 3A shows an clean patch of an example electronic document and a noisy patch of the example electronic document used to train the AI algorithm, according to some embodiments.

FIG. 3A shows an clean patch of an example electronic document and a noisy patch of the example electronic document used to train the AI algorithm, according to some embodiments. The clean patch 301 of the example electronic document has minimum artifacts. The document restoring system (such as the document restoring system 100 in FIG. 1) can add artifacts (e.g., Gaussian blur) to the clean patch 301 to generate the noisy patch 302. The document restoring system can provide the noisy patch 302 as the input to the AI algorithm and the clean patch 301 as the intended output to the AI algorithm to train the AI algorithm.

Figure 3B:
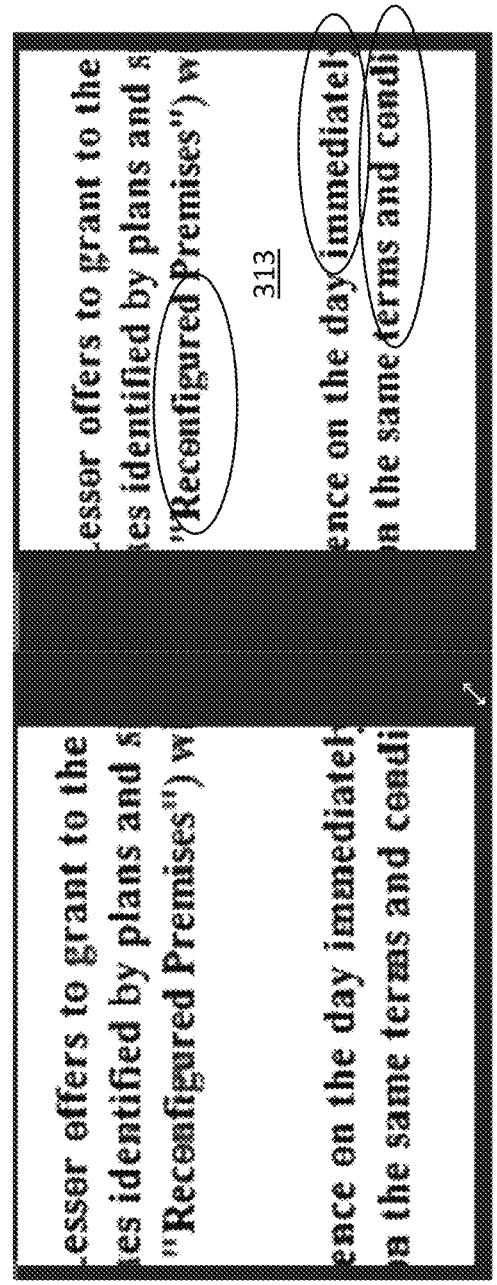
FIG. 3B shows examples of de-noised patches using the trained AI algorithms, according to some embodiments.

FIG. 3B shows examples of de-noised patches using the trained AI algorithms, according to some embodiments. The de-noised patch 311 is generated by cleaning the corresponding clean patch (not shown) of the de-noised patch 311 using the trained AI algorithm. The corresponding clean patch (not shown) of the de-noised patch 311 is not converted from a positive image to a negative image before providing it to the trained AI algorithm. In other words, the de-noised patch 311 is a result of the document restoring system cleaning the positive image using the trained AI algorithm. In comparison, the de-noised patch 312 is generated by cleaning the corresponding clean patch (not shown) of the de-noised patch 312 using the trained AI algorithm. The corresponding clean patch (not shown) of the de-noised patch 312 is converted from a positive image to a negative image before providing it to the trained AI algorithm. In other words, the document restoring system converted the positive image to a negative image and them provide the negative image as an input to the trained AI algorithm. As shown in FIG. 3B, the alphanumeric characters in the circled areas 313 in the de-noised patch 312 are more distinct than the corresponding characters in the de-noised patch 311. Using negative images with the trained AI algorithm can produce better quality of the de-noised images because the alphanumeric characters in negative images often have higher pixel values than the background. The weighting parameters in the trained AI algorithm can be more sensitive to the alphanumeric characters than the background, thus producing better quality of the de-noised images.

Figure 4:
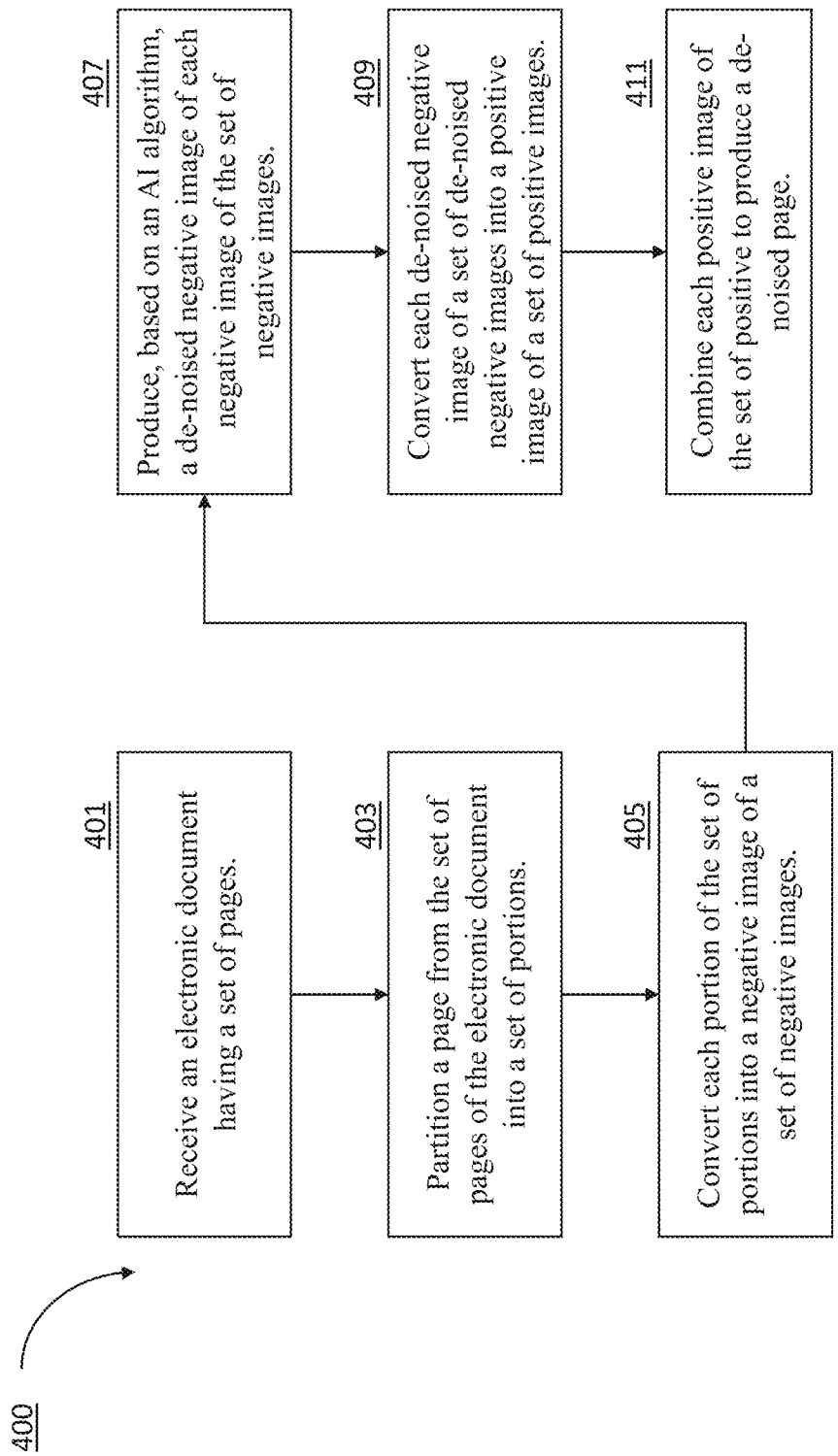
FIG. 4 shows a flow chart illustrating a document restoring process using a trained artificial intelligence algorithm, according to some embodiments.

FIG. 4 shows a flow chart illustrating a document restoring process using a trained artificial intelligence algorithm, according to some embodiments. This document restoring process 400 can be implemented at a processor and/or a memory (e.g., processor 110 or memory 121 as discussed with respect to FIG. 1 of an document restoring system 100).

At 401, the document restoring process 400 includes receiving an electronic document having a set of pages. In some implementations, the electronic document includes alphanumeric characters and can be a scanned document or an image taken by a camera. In some instances, the electronic document can be in Portable Document Format (PDF), a format of JPEG, BMP, PNG, TIFF, and/or other document file formats. Each page of the electronic document can be (or be converted to) an 8-bit greyscale image having alphanumeric characters (e.g., texts and numbers). Each page of the electronic document (or each patch) can be a positive image. In some instances, the electronic document can include a page in color. The document restoring system 100 can convert the color page (having, for example, three filters: red, blue, and green) to a page in grey scale (e.g., having one filter with pixel values between 0 to 255). The document restoring system 100 can (by executing the document pre-processing program 124) normalize the pixel value of 0-255 to between 0 to 1 or −1 to +1. In some instances, the distribution can be shifted around the mean or median pixel value of the batch (i.e., the set of patches) or the entire document. In some instances, the document restoring system 100 can normalize pixel values of both negative images and positive images to between 0 and 1.

At 403, the document restoring process 400 includes partitioning a page from the set of pages of the electronic document into a set of portions (or a set of patches). In some instances, each patch of the set of patches can have a size of 250 pixels×250 pixels. In other words, each patch has a size substantially in a first direction of a multiple of 250 pixels and a size substantially in a second direction perpendicular to the first direction of a multiple of 250 pixels. In some instances, each page of the document can be scaled to the nearest multiple of 250 pixels in each direction before dividing the page into a set of patches.

At 405, the document restoring process 400 includes converting each portion of the set of portions into a negative image of a set of negative images. The negative image is generated by changing the pixel values of each pixel symmetrically relative to the middle point of 0-255 (i.e., 127.5) for a 8-bit greyscale image. In the positive image, for the typical document with a white background and black alphanumeric characters, the pixel values of the alphanumeric characters are generally lower than the pixel values of the background. In the negative image, for the typical document with a white background and black alphanumeric characters, the pixel values of the alphanumeric characters are generally higher than the pixel values of the background.

At 407, the document restoring process 400 includes producing, based on an artificial intelligence algorithm, a de-noised negative image of each negative image of the set of negative images. The artificial intelligence algorithm (e.g., an auto-encoder based on Deep Neural Networks (DNNs)) is a trained AI algorithm. The trained AI algorithm is generated using a training dataset including a set of noisy patches as an input and a corresponding set of clean patches as the intended result. In some instances, the training dataset is converted to negative images before being used to train the AI algorithm.

At 409, the document restoring process 400 includes converting each de-noised negative image of a set of de-noised negative images into a positive image of a set of positive images. At 411, the document restoring process 400 includes combining each positive image of the set of positive images to produce a de-noised page. The de-noised page has artifacts less than artifacts of the page of the electronic document. In some instances, the document restoring system can assign each patch of the set of patches of the document a position identifier of a set of position identifiers when the document restoring system partitions the document (or the page) into the set of patches. The document restoring system can combine the set of de-noised positive patches based on the position identifier of that patch and generate the de-noised page.

Although various embodiments have been described as having particular features and/or combinations of components, other embodiments are possible having a combination of any features and/or components from any of embodiments as discussed above.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™ Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

What is claimed is:

1. An apparatus, comprising:
a memory; and
a processor operatively coupled to the memory, the processor configured to:
receive an electronic document having a plurality of pages,
partition a page from the plurality of pages of the electronic document into a plurality of portions, the page including alphanumeric characters,
convert each portion of the plurality of portions into a negative image of a plurality of negative images,
produce, based on an artificial intelligence algorithm, a de-noised negative image of each negative image of the plurality of negative images,
convert each de-noised negative image of a plurality of de-noised negative images into a positive image of a plurality of positive images, and
combine each positive image of the plurality of positive images to produce a de-noised page, the de-noised page having artifacts less than artifacts of the page of the electronic document.

2. The apparatus of claim 1, wherein the processor is configured to convert each portion of the plurality of portions into the negative image of the plurality of negative images by changing a pixel value of each pixel of a plurality of pixels in each portion of the plurality of portions.

3. The apparatus of claim 1, wherein at least one pixel value associated with an alphanumeric character of alphanumeric characters in the plurality of portions is less than at least one pixel value associated with the alphanumeric character in the plurality of negative images.

4. The apparatus of claim 1, wherein at least one pixel value associated with an alphanumeric character of alphanumeric characters in the plurality of de-noised negative images is greater than at least one pixel values associated with the alphanumeric character in the plurality of positive images.

5. The apparatus of claim 1, wherein each portion of the plurality of portions has a size substantially in a first direction of a multiple of 250 pixels and a size substantially in a second direction perpendicular to the first direction of a multiple of 250 pixels.

6. The apparatus of claim 1, wherein the artificial intelligence algorithm is a Deep Neural Network algorithm.

7. The apparatus of claim 6, wherein the Deep Neural Network algorithm includes an auto-encoder algorithm based on convolutional layers.

8. The apparatus of claim 1, wherein:
the processor is configured to generate a first plurality of training images having training alphanumeric characters,
the processor is configured to generate, based on the first plurality of training images, a second plurality of training images having artifacts greater than artifacts of the first plurality of training images,
the processor is configured to convert the first plurality of training images into a first plurality of negative training images,
the processor is configured to convert the second plurality of training images into a second plurality of negative training images,
the processor is configured to train the artificial intelligence algorithm based on the first plurality of negative training images and the second plurality of negative training images to produce a trained artificial intelligence algorithm, the processor is configured to produce the de-noised page based on the images artificial intelligence algorithm.

9. The apparatus of claim 1, wherein:

the page includes non-alphanumeric content, the processor is configured to remove the non-alphanumeric content from the page prior to partitioning the page into the plurality of portions.

10. A method, including:

partitioning an electronic document into a plurality of document portions, the electronic document having a background pixel with a first pixel value and an alphanumeric character pixel with a second pixel value, the first pixel value of the background pixel being greater than the second pixel value of the alphanumeric character pixel;

modifying the plurality of document portions to generate a plurality of negative document portions in which the background pixel has a third pixel value and the alphanumeric character pixel has a fourth pixel value, the third pixel value of the background pixel being less than the fourth pixel value of the alphanumeric character pixel;

producing, based on a deep neural network algorithm and the plurality of negative document portions, a plurality of de-noised negative document portions having artifacts less than artifacts in the plurality of negative document portions;

modifying the plurality of de-noised negative document portions to produce a plurality of de-noised positive document portions; and combining the plurality of de-noised positive document portions to produce a de-noised electronic document.

11. The method of claim 10, wherein the second pixel value of the alphanumeric character pixel in the plurality of document portions and the fourth pixel value of the alphanumeric character pixel in the plurality of negative document portions total to 255.

12. The method of claim 10, wherein the producing plurality of de-noised negative document portions does not require manual input.

13. The method of claim 10, wherein the artifacts in the plurality of negative document portions includes blurring, fading, salt and pepper, or watermarks.

14. The method of claim 10, wherein each document portion of the plurality of document portions has a size of 250 pixels times 250 pixels.

15. The method of claim 10, further comprising:

training the Deep Neural Network (DNN) algorithm with clean negative training data and noisy negative training data to generate a trained DNN algorithm;

generating modified plurality of de-noised negative document portions based on the trained DNN algorithm.

16. The method of claim 10, wherein:

the electronic document includes graphic data, the method includes extracting the graphic data from the electronic document prior to partitioning the electronic document into the plurality of document portions.

17. The method of claim 10, wherein:

each document portion of the plurality of document portions has a position identifier of a plurality of identifiers;

the combining the plurality of de-noised positive document portions is based on the position identifier of that document portion.

18. The method of claim 10, further comprising:

receiving the electronic document from an optical character recognition program.

19. A processor-readable non-transitory medium storing code representing instructions to be executed by a processor, the code comprising code to cause the processor to:

divide an electronic document into a first plurality of positive document segments, each positive document segment from the first plurality of positive document segments having a position identifier of a plurality of position identifiers;

modify the first plurality of positive document segments of the electronic document to generate a first plurality of negative document segments;

generate, based on an artificial intelligence algorithm and the first plurality of negative document segments, a second plurality of negative document segments;

generate, based on the second plurality of negative document segments, a second plurality of positive document segments, the second plurality of positive document segments having artifacts less than artifacts of the first plurality of positive document segments; and combine the second plurality of positive document segments based on the plurality of position identifiers to produce a de-noised electronic document.

20. The processor-readable non-transitory medium of claim 19, wherein:

the electronic document includes graphic data, the code further comprises code to cause the processor to extract the graphic data from the electronic document prior to dividing the electronic document into the first plurality of positive document segments.

* * * * *